(12) United States Patent
Yoshikawa et al.

(10) Patent No.: US 8,048,502 B2
(45) Date of Patent: Nov. 1, 2011

(54) READILY DEGRADABLE RESIN COMPOSITION AND BIODEGRADABLE CONTAINER USING THE SAME

(75) Inventors: Seishi Yoshikawa, Kanagawa (JP); Mitsuhiro Yoshida, Kanagawa (JP); Masahito Kogure, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 50 days.

(21) Appl. No.: 12/442,583

(22) PCT Filed: Sep. 26, 2007

(86) PCT No.: PCT/JP2007/068633
§ 371 (c)(1),
(2), (4) Date: Mar. 24, 2009

(87) PCT Pub. No.: WO2008/038648
PCT Pub. Date: Apr. 3, 2008

(65) Prior Publication Data
US 2010/0086718 A1    Apr. 8, 2010

(30) Foreign Application Priority Data

Sep. 26, 2006   (JP) ................. 2006-260540

(51) Int. Cl.
*B29D 22/00* (2006.01)
*B29D 23/00* (2006.01)
*B32B 1/08* (2006.01)

(52) U.S. Cl. ............ 428/35.7; 428/36.9; 220/DIG. 30; 206/524.6; 206/524.7; 524/269; 524/314; 524/556; 523/124

(58) Field of Classification Search ............ 428/35.7, 428/36.9; 220/DIG. 30; 206/524.6, 524.7; 524/269, 314, 556; 523/124
See application file for complete search history.

(56) References Cited

U.S. PATENT DOCUMENTS
6,235,825 B1 * 5/2001 Yoshida et al. ......... 524/314
2005/0027081 A1   2/2005 Okushita et al.

FOREIGN PATENT DOCUMENTS
EP     0749997 A2    12/1996
(Continued)

OTHER PUBLICATIONS

Search Report and Written Opinion for PCT/JP2007/068633 dated Jul. 17, 2007.

(Continued)

*Primary Examiner* — Michael C Miggins
(74) *Attorney, Agent, or Firm* — Hoffmann & Baron, LLP

(57) ABSTRACT

Disclosed is a readily degradable resin composition having excellent biodegradability. Specifically disclosed is a readily degradable resin composition comprising: an aliphatic polyester (A) which has biodegradability; and an aliphatic polyester (B) which has a solution viscosity (η inh) of 0.25 dl/g or less as measured in a mixed solvent composed of m-chlorophenol and 1,2,4-trichlorobenzene at a weight-based ratio of 4:1 at a concentration of 0.4 g/dl and at a temperature of 30° C. and a melt viscosity of 50 Pa S or less as measured at 190° C. at a shear rate of 1 rad/s and is capable of biodegraded at a more rapid degradation rate than the aliphatic polyester (A). Also disclosed is a readily degradable resin composition comprising: an aliphatic polyester (A) which has biodegradability; and an aliphatic polyester (B') which, when hydrolyzed, can release an acid showing a pH value of 2.0 or less when dissolved in water at a concentration of 0.005 g/ml and is capable of biodegraded at a more rapid degradation rate than the aliphatic polyester (A). Further disclosed is a biodegradable container comprising the readily degradable resin composition.

13 Claims, 6 Drawing Sheets

COMPARATIVE EXAMPLE 1

EXAMPLE 3

INITIAL STAGE

ENZYMATICALLY TREATED AT 37°C FOR 48 HOURS

FOREIGN PATENT DOCUMENTS

| | | | |
|---|---|---|---|
| EP | 0 821 036 A1 | 1/1998 | |
| EP | 1505097 A1 | 2/2005 | |
| JP | 09-316181 | 12/1997 | |
| JP | 11-116788 | 4/1999 | |
| JP | 411116788 A | * | 4/1999 |
| JP | 2004-259573 | 9/2004 | |
| JP | 2005-060686 | 3/2005 | |
| JP | 2007-070426 | 3/2007 | |
| WO | 2006/083044 A1 | 8/2006 | |

OTHER PUBLICATIONS

Supplementary European Search Report for EP 07 82 8406, Nov. 23, 2010.

Database WPI, Week 200657, Thomson Scientific, London, GB; AN 2006-559944 & WO 2006/083044 A1; Aug. 10, 2006; XP-002608590.

Official Action issued on May 20, 2011 for Chinese Patent Application No. 200780043797.1.

* cited by examiner

FIG.1
INITIAL STAGE | ENZYMATICALLY TREATED AT 37°C FOR 48 HOURS
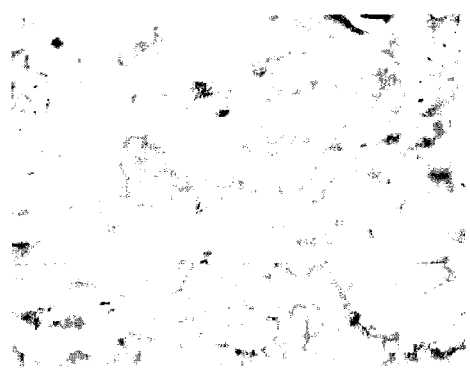
COMPARATIVE EXAMPLE 1
EXAMPLE 3

SOLUBILITY RATE IN WATER

READILY DEGRADABLE RESIN COMPOSITION AND BIODEGRADABLE CONTAINER USING THE SAME

CROSS-REFERENCE TO RELATED APPLICATIONS

This application is a National Stage of International Application No. PCT/JP2007/068633, filed Sept. 26, 2007, which claims the benefit of Japanese Application No. 2006-260540, filed Sept. 26, 2006, the contents of all of which are incorporated by reference herein in their entirety.

FIELD OF THE INVENTION

The present invention relates to a readily degradable resin composition constituting a biodegradable container that facilitates resource recycling.

BACKGROUND ART

Biodegradable polylactic acid resin compositions and the like are proposed as packaging materials (see Patent Documents 1 and 2). However, a packaging container using such a biodegradable resin composition is sequentially degraded from the surface of the container. Thus, complete degradation of the whole container takes a considerable time. In addition, there is a problem that such a biodegradable container has readily degradable portions and hardly degradable portions, since the degradation rate is influenced by the internal structure of the resin such as the crystallinity of the resin and the molecular orientation thereof.

Patent Document 1: Japanese Patent Application Publication No. Hei 11-116788
Patent Document 2: Japanese Patent Application Publication No. Hei 9-316181

SUMMARY OF THE INVENTION

Problems to be Solved by the Invention

An object of the present invention is to provide a readily degradable resin composition with a great biodegradability.

Means for Solving the Problems

The present invention provides a readily degradable resin composition including: an aliphatic polyester (A) which is biodegradable; and an aliphatic polyester (B) which is biodegradable at a higher degradation rate than that of the aliphatic polyester (A) and which has a melt viscosity of 50 Pa·S or less at 190° C. and at a shear rate of 1 rad/s or a solution viscosity (η inh) of 0.25 dl/g or less measured under conditions of a concentration of 0.4 g/dl and of a temperature of 30° C. in a solvent of m-chlorophenol and 1,2,4-trichlorobenzene mixed at a weight ratio of 4:1.

In addition, the present invention also provides a readily degradable resin composition including: an aliphatic polyester (A) which is biodegradable; and an aliphatic polyester (B') which is biodegradable at a higher degradation rate than that of the aliphatic polyester (A) and which releases, upon hydrolysis, an acid showing a pH of 2.0 or less when dissolved in water at a concentration of 0.005 g/ml.

Moreover, the present invention provides a biodegradable container including the readily degradable resin composition.

EFFECTS OF THE INVENTION

A container or the like with an excellent biodegradability can be obtained from the readily degradable resin composition according to the present invention.

DETAILED DESCRIPTION OF THE INVENTION

In one aspect, the readily degradable resin composition of the present invention includes: an aliphatic polyester (A) which is biodegradable; and an aliphatic polyester (B) which is biodegradable at a higher degradation rate than that of the aliphatic polyester (A) and which has a melt viscosity of 50 Pa·S or less at 190° C. and at a shear rate of 1 rad/s or a solution viscosity (η inh) of 0.25 dl/g or less measured under conditions of a concentration of 0.4 g/dl and of a temperature of 30° C. in a solvent of m-chlorophenol and 1,2,4-trichlorobenzene mixed at a weight ratio of 4:1.

Examples of the biodegradable aliphatic polyester (A) include a polylactic acid resin; polybutylene succinate; polycaprolactone; polyhydroxybutyrate; a polybutylene succinate/adipate copolymer; and aromatic polyesters such as polyethylene terephthalate, polyethylene naphthalate and polybutylene terephthalate. These polyesters may be used alone or in combination of two or more kinds thereof.

The polylactic acid resin is not particularly limited, as long as the polylactic acid resin is a polyester resin obtained by polymerizing lactic acid.

The polylactic acid resin may be a homopolymer, a copolymer or a polymer blend of polylactic acid.

Examples of component to form such a copolymer include polyvalent alcohols such as ethylene glycol, propylene glycol, butanediol, octanediol, dodecanediol, neopentyl glycol, glycerine, pentaerythritol, sorbitan, bisphenol A, and polyethylene glycol; dicarboxylic acids such as succinic acid, adipic acid, sebacic acid, glutaric acid, decanedicarboxylic acid, cyclohexanedicarboxylic acid, terephthalic acid, isophthalic acid and anthracene dicarboxylic acid; hydroxycarboxylic acids such as glycolic acid, hydroxypropionic acid, hydroxybutyric acid, hydroxyvaleric acid, hydroxycaproic acid, and hydroxybenzoic acid; lactones such as glycolide, caprolactone, butyrolactone, valerolactone, propiolactone, and undecalactone; and the like.

Examples of polymer to be blended include celluloses, chitin, glycogen, chitosan, polyamino acid, and starch. Note that the lactic acid used in polymerization may be any of L-isomer and D-isomer, or a mixture of L-isomer and D-isomer.

Examples of preferred biodegradable aliphatic polyester (A) include a polylactic acid resin and polybutylene succinate.

The molecular weight of the biodegradable aliphatic polyester (A) is not particularly limited; however, in consideration of mechanical properties and processability, the molecular weight is preferably in a range of 5,000 to 1,000,000, and more preferably in a range of 10,000 to 500,000, in weight average molecular weight.

The aliphatic polyester (B) is biodegradable at a higher degradation rate than that of the aliphatic polyester (A), and has a melt viscosity of 50 Pa·S or less at 190° C. and at a shear rate of 1 rad/s or a solution viscosity (η inh) of 0.25 dl/g or less measured under conditions of a concentration of 0.4 g/dl and of a temperature of 30° C. in a solvent of m-chlorophenol and 1,2,4-trichlorobenzene mixed at a weight ratio of 4:1. Here, in the present specification, "being biodegradable at a higher degradation rate" refers to the fact that, when a simple polymer is enzymatically degraded in an aqueous solution, the amount of eluted degradation products per day (degradation rate) is larger (higher) than that of the aliphatic polyester (A), and preferably refers to the fact that the amount of the degradation product (degradation rate) of the single polymer is twice or more as large (high) as that of the aliphatic polyester (A). In the present specification, the aliphatic polyester (B) which is biodegradable at a higher degradation rate than that of the aliphatic polyester (A) is referred to as a "readily degradable aliphatic polyester (B)" for the sake of convenience (an aliphatic polyester (B') to be described later is similarly referred to as a "readily degradable aliphatic polyester (B')"). Note that an example of the aliphatic polyester having a melt viscosity of 50 Pa·S or less at 190° C. and at a shear rate of 1 rad/s or a solution viscosity ($\eta$ inh) of 0.25 dl/g or less measured under conditions of a concentration of 0.4 g/dl and of a temperature of 30° C. in a solvent of m-chlorophenol and 1,2,4-trichlorobenzene mixed at a weight ratio of 4:1 includes an aliphatic polyester having such a low molecular weight as a number average molecular weight of 30000 or less.

When a readily degradable resin composition including the readily degradable aliphatic polyester (B) is placed under degrading conditions, for example, in an enzyme solution, the readily degradable aliphatic polyester (B) rapidly degrades, forming a large number of pores inside the aliphatic polyester (A). For this reason, the surface area on which the enzyme acts is increased, resulting in an increased degradation rate of the aliphatic polyester (A). Examples of the readily degradable aliphatic polyester (B) include polyethylene oxalate, poly(neopentyl) oxalate (PNOx), polyethylene maleate, and the like.

In another aspect, the readily degradable resin composition of the present invention includes: an aliphatic polyester (A) which is biodegradable; and an aliphatic polyester (B') which is biodegradable at a higher degradation rate than that of the aliphatic polyester (A) and which releases, upon hydrolysis, an acid showing a pH of 2.0 or less when dissolved in water at a concentration of 0.005 g/ml.

The aliphatic polyester (B') releases, upon hydrolysis, an acid with a low pH of 2.0 or less, for example, pH 1.5 or less, or pH 1.3 or less, and preferably pH 1.0 or less. Examples of the acid to be released include oxalic acid and maleic acid. By use of such an aliphatic polyester (B'), the aliphatic polyester (A) degrades rapidly. This is presumably because, when water enters and elutes the aliphatic polyester (B'), the eluted acid component hydrolyzes the aliphatic polyester (A) such as polylactic acid, causing a large number of cracks inside the aliphatic polyester (A), which further increases the surface area on which an enzyme acts. In addition, the number average molecular weight of the aliphatic polyester (B') is preferably 30000 or less, that is, the aliphatic polyester (B') preferably has a solution viscosity ($\eta$ inh) of 0.25 dl/g or less measured under conditions of a concentration of 0.4 g/dl and of a temperature of 30° C. in a solvent of m-chlorophenol and 1,2,4-trichlorobenzene mixed at a weight ratio of 4:1 or has a melt viscosity of 50 Pa·S or less at 190° C. and at a shear rate of 1 rad/s. At this time, the aliphatic polyester (B') can not only cause cracks in the aliphatic polyester (A) by releasing an acid upon hydrolysis, but also form pores inside the aliphatic polyester (A) by the elution. As a result, a larger number of enzymatic action sites can be formed inside the aliphatic polyester (A), which can further accelerate the degradation rate.

Examples of the readily degradable aliphatic polyester (B') include polyethylene oxalate, poly(neopentyl) oxalate (PNOx), polyethylene maleate, and the like.

The readily degradable aliphatic polyester (B) or (B') is preferably dispersed in the aliphatic polyester (A). An enzyme can enter voids and act in the voids from which the degraded readily degradable aliphatic polyester (B) or (B') is released and dissolved into water. Thus, the readily degradable resin composition is degraded not only from the surface thereof, but also from the inside thereof. For this reason, the degradation rate is accelerated.

Here, in order to attain a good degradation rate, the readily degradable aliphatic polyester (B) or (B') is preferably present in the aliphatic polyester (A) in a uniformly and finely dispersed manner. One or more monomer components of the aliphatic polyester (A) may be polymerized to the readily degradable aliphatic polyester (B) or (B'), in order to improve the dispersibility of the readily degradable aliphatic polyester (B) or (B') in the aliphatic polyester (A).

Furthermore, the readily degradable aliphatic polyester (B) or (B') is preferably highly polarized, i.e., preferably has high affinity to water. The readily degradable aliphatic polyester (B) or (B') as described above has an increased hydrolysis rate. Thus, a large number of pores are formed rapidly inside the aliphatic polyester (A), which increase the area on which an enzyme acts. As a result, the degradation rate of the aliphatic polyester (A) is accelerated. The polarity can be indicated by a SP value (solubility parameter) calculated by the Fedors method (Polym. Eng. Sci., 14, 147-154 (1974)). The SP value should be, in an example case, 22.0 or more, 23.0 or more, or 24.0 or more and is preferably 25.0 or more.

In the readily degradable resin composition of the present invention, the content of the readily degradable aliphatic polyester (B) or (B') is preferably 1 to 30% by weight, and more preferably 5 to 20% by weight, in consideration of mechanical properties and processability.

The readily degradable resin composition of the present invention can be produced by uniformly mixing the biodegradable aliphatic polyester (A) and the readily degradable aliphatic polyester (B) or (B') by an ordinary method. For example, the biodegradable aliphatic polyester (A) and the readily degradable aliphatic polyester (B) or (B') are simultaneously fed to a single- or twin-screw extruder-kneader to be melt-mixed, and thereafter are palletized. Thus, the readily degradable resin composition of the present invention can be produced. The melt-extrusion temperature is generally 100 to 250° C.; however, those skilled in the art can set any melt-extrusion temperature appropriately, in consideration of the glass transition temperatures, the melting points, and the mixing ratio of the biodegradable aliphatic polyester (A) and the readily degradable aliphatic polyester (B) or (B') to be used.

The readily degradable resin composition of the present invention may be blended with publicly-known additives such as a plasticizer, a heat stabilizer, a light stabilizer, an antioxidant, an ultraviolet absorber, a fire retardant, a coloring agent, a pigment, a filler, a bulking agent, a mold release agent, an antistatic agent, a perfume, a lubricant, a foaming agent, an antibacterial/antifungal agent, and an nucleating agent, if necessary. Meanwhile, a resin other than the biodegradable aliphatic polyester (A) and the readily degradable aliphatic polyester (B) or (B') may be blended within a range not impairing effects of the present invention. For example, water soluble resins such as polyethylene glycol, and polyvinyl alcohol as well as polyethylene, polypropylene, an ethylene-propylene copolymer, an acid modified polyolefin, an ethylene-methacrylic acid copolymer, an ethylene-vinyl acetate copolymer, an ionomer resin, polyethylene terephthalate, polybutylene terephthalate, polyvinyl acetate, polyvinyl chloride, polystyrene, a polyester rubber, a polyamide rubber, a styrene-butadiene-styrene copolymer, and the like can be blended. Meanwhile, a copolymer of the biodegradable aliphatic polyester (A) and the readily degradable aliphatic polyester (B) or (B') may be blended in order to improve dispersibility of the readily degradable aliphatic polyester (B) or (B').

A publicly-known forming method can be used to produce a container using the readily degradable resin composition of the present invention.

For example, a multilayer film, a multilayer sheet, a multilayer parison, a multilayer pipe, and the like can be molded by extrusion molding using a number of extruders, the number being equivalent to the number of kinds of resin and using a multiple die for multilayer. Meanwhile, a multilayer preform for bottle forming can be produced by co-injection molding such as a simultaneous injection method or a sequential injection method using a number of injection molding machines, the number being equivalent to the number of kinds of resin. By further processing such a multilayer film, parison or preform, the container using the readily degradable resin composition of the present invention can be obtained.

A packaging material such as a film can be used for a pouch of various forms or as a top member of a tray or a cup. Examples of pouch includes three- or four-side sealed flat pouches, pouches with a gusset, standing pouches, pillow packaging bags and the like. These pouches and bags can be produced by a publicly-known pouch or bag forming method. Meanwhile, a packaging container of a cup shape or a tray shape can be obtained by subjecting the film or the sheet to means such as vacuum molding, pressure molding, stretch molding or plug-assist molding.

An extrusion coating method or a sandwich lamination can be used to produce a multilayer film or a multilayer sheet. Meanwhile, a single-layer or multilayer film formed in advance can be laminated by dry lamination to produce a multilayer film or a multilayer sheet. Examples include lamination of a transparent biodegradable deposition film by dry lamination onto a double layered co-extrusion film formed of a readily degradable resin composition/a polylactic acid (sealant) layer and a method in which two layers of a readily degradable resin composition/polylactic acid (sealant) are extrusion-coated onto a double layered film of polylactic acid/polyglycolic acid laminated by dry lamination with an anchoring agent interposed therebetween. However, the lamination method is not limited to these.

In addition, a bottle or a tube can be easily molded by pinching-off a parison, a pipe or a preform with a pair of split dies and then by blowing a fluid into the pinched-off parison, pipe or preform. In addition, an oriented blow-molded bottle and the like can be obtained as follows. Specifically, a pipe or a preform is cooled, thereafter, heated to an orientation temperature, and then oriented in the axial direction, while blow-oriented in the circumferential direction by a fluid pressure.

EXAMPLES

Hereinafter, the present invention is specifically described with reference to Examples.

(1) Measurement of Melt Viscosity ($\eta^*$)

The melt viscosity (Pa·S) of synthesized polyethylene oxalate that was vacuum-dried at 120° C. for 1 hour was measured by use of a rheometer (ARES manufactured by TA Instruments, Inc.) at 190° C. and at a shear rate of 1 rad/s.

(2) Solution Viscosity ($\eta$ inh)

Synthesized polyethylene oxalate that was vacuum-dried at 120° C. for 1 hour was used. The polyethylene oxalate was immersed in a mixture solvent of m-chlorophenol/1,2,4-trichlorobenzene=4/1 (weight ratio) and dissolved at 150° C. for approximately 10 minutes to prepare a solution at a concentration of 0.4 g/dl. Thereafter, the melt viscosity was measured at 30° C. by use of an Ubbelohde viscometer (Unit dl/g).

(3) Synthesis of Polyethylene Oxalate (PEOx)

118 g (1.0 mol) of dimethyl oxalate, 93 g (1.5 mol) of ethylene glycol, and 0.2 g of tetrabutyl titanate were introduced into a 300-mL separable flask equipped with a mantle heater, a stirrer, a nitrogen inlet and a condenser. The flask was heated under nitrogen stream from 110° C. until the inside temperature reached 150° C., while methanol was being distilled off. Eventually, 70 ml of methanol was distilled off. Thereafter, stirring was performed at an inside temperature of 160° C. and at a reduced pressure of 0.1 to 0.5 mmHg. After 4 and a half hours, the viscosity increased, and the product was taken off. The melt viscosity at 190° C. and at a shear rate of 1 rad/s was 42 Pa·S. Meanwhile, was 0.12.

(4) Preparation of Enzyme Solution 20 mg of a Proteinase K powder from Tritirachium album was dissolved in 1 ml of a 0.05 M Tris-HCl buffer (pH 8.0) containing 50 w/w % of glycerin.

Example 1

Formation of Cast Film of Blended Polymer 0.80 g of polylactic acid (LACEA H-100 manufactured by Mitsui Chemicals, Inc.) and 0.20 g of polyethylene oxalate were dissolved in 10 to 12 ml of an HFIP solvent (hexafluoroisopropanol manufactured by Central Glass Co., Ltd.) to achieve a content of polyethylene oxalate in polylactic acid of 20% by weight, and then the mixture was cast on a Petri dish. After the cast, overnight drying was performed in a vacuum dryer kept at 40° C. The film thickness after drying was 40 μm.

(Enzymatic Degradation Test)

An enzymatic degradation solution was prepared by adding 12 μl of the enzyme solution into 10 ml of the 0.01 M Tris-HCl buffer (pH 8.0). Into the enzymatic degradation solution, the cast film cut into 1 cm×2 cm was immersed, and shaken at 37° C. and at 50 rpm. 16 hours, 48 hours, 120 hours, and 168 hours after the start of the degradation, the degradation state of the film was visually observed and the enzyme solution was exchanged. Table 1 shows the results of the degradation. Note that "Start of collapse" means a state where change in the shape of the film, for example, hole formation starts to appear, and "Completely degraded" means a state where the film collapses and the original shape is lost.

Example 2

Example 2 was conducted in the same manner as that in Example 1 except that the temperature in the enzymatic degradation test was changed to 60° C.

Example 3

Example 3 was conducted in the same manner as that in Example 1 except that the content of polyethylene oxalate was changed to 5% by weight.

Example 4

Example 4 was conducted in the same manner as that in Example 3 except that the temperature in the enzymatic degradation test was changed to 60° C.

Comparative Example 1

Comparative Example 1 was conducted in the same manner as that in Example 1 except that polyethylene oxalate was not used and that only polylactic acid was used.

Comparative Example 2

Comparative Example 2 was conducted in the same manner as that in Comparative Example 1 except that the temperature in the enzymatic degradation test was changed to 60° C.

Comparative Example 3

Comparative Example 3 was conducted in the same manner as that in Example 1 except that polyethylene oxalate with a solution viscosity (η inh) of 1.2 dl/g was used and that the content thereof was changed to 5%.

As for a film blended with the polyethylene oxalate with a solution viscosity (η inh) of 1.2 dl/g, degradation as observed in Examples 1 to 4 shown in Table 1 was not observed.

TABLE 1

| | Amount of PEOx added (%) | Reaction temperature (°C.) | Reaction time | | | |
|---|---|---|---|---|---|---|
| | | | 16 hours | 48 hours | 120 hours | 168 hours |
| Example 1 | 20 | 37 | Not collapsed | Completely degraded | | |
| Example 2 | 20 | 60 | Start of collapse | Completely degraded | | |
| Example 3 | 5 | 37 | Not collapsed | Start of collapse | Completely degraded | |
| Example 4 | 5 | 60 | Not collapsed | Start of collapse | Completely degraded | |
| Comparative Example 1 | 0 | 37 | Not collapsed | Not collapsed | Not collapsed | Not collapsed |
| Comparative Example 2 | 0 | 60 | Not collapsed | Not collapsed | Not collapsed | Not collapsed |
| Comparative Example 3 | 5 | 37 | Not collapsed | Not collapsed | Not collapsed | Not collapsed |

Meanwhile, FIG. 1 shows electron microphotographs of the films of Example 3 and Comparative Example 1 enzymatically degraded for 48 hours.

(Water Immersion Test)

Weight decrease of the films of Examples 1 and 3 and Comparative Example 1 were measured after immersion in hot water at 60° C. The results are shown in FIG. 2. Meanwhile, FIG. 3 shows electron microphotographs of the films of Example 3 and Comparative Example 1 immersed in water at 37° C. for 48 hours. These results show that polyethylene oxalate dispersed in polylactic acid degraded and was eluted into water, and thus voids were formed in the films of polylactic acid.

(Film Formation Method)

A film of 300 μm was formed by heating an appropriate amount of a polyethylene oxalate resin at 120° C. for 5 minutes and thereafter by heat-pressing the polyethylene oxalate resin at a pressure of 30 kgf/cm² for 2 minutes. As for polylactic acid, a film of 100 μm was formed by the same method except that the temperature was changed to 200° C.

(Biodegradation Test)

An enzymatic degradation solution was prepared by adding 12 μl of the enzyme solution into 10 ml of the 0.01 M Tris-HCl buffer (pH 8.0). Into the enzymatic degradation solution, the polyethylene oxalate film with a thickness of 300 μm and cut into 1 cm×1 cm was immersed, and shaken at 37° C. and at 50 rpm. 24 hours after the start of degradation, supernatant liquid was taken out, passed through a filter of 0.45 μm, and then subjected to a measurement of an eluted total organic carbon using TOC-5000A manufactured by Shimadzu Corporation. As an target to be compared therewith, the polylactic acid film with a thickness of 100 μm was enzymatically degraded, and subjected to the measurement of an eluted total organic carbon in the same procedure. Table 2 as follows shows the results.

[Table 2]

TABLE 2

| | Biodegradability |
|---|---|
| Polylactic acid | 44.7 ppm/cm² · 24 hr |
| Polyethylene oxalate | 398.6 ppm/cm² · 24 hr |

(Comparison of Degradation Rates at Different pH)

Example 5

A film was formed in the same manner as that in Example 1 except that the content of polyethylene oxalate was changed to 5% by weight.

Reference Example 1

A film was formed in the same manner as that in Example 5 except that maleic anhydride (manufactured by Wako Pure Chemical Industries, Ltd.) was used in place of polyethylene oxalate, and that chloroform was used as the solvent.

Comparative Example 4

A film was formed in the same manner as that in Example 5 except that polyethylene succinate was used in place of polyethylene oxalate, and that chloroform was used as the solvent.

Note that polyethylene succinate was synthesized as follows.

Synthesis of Polyethylene Succinate (PES)

174 g (1.0 mol) of diethyl succinate, 93 g (1.5 mol) of ethylene glycol, and 0.2 g of tetrabutyl titanate were introduced into a 300-mL separable flask equipped with a mantle heater, a stirrer, a nitrogen inlet and a condenser. The flask was heated under nitrogen stream from 110° C. until the inside temperature reached 180° C., while ethanol was being distilled off. Eventually, 90 ml of ethanol was distilled off. Thereafter, stirring was performed at an inside temperature of 200° C. and at a reduced pressure of 0.1 to 0.5 mmHg. After 4 and a half hours, the viscosity increased, and the product was taken off.

Comparative Example 5

A film was formed in the same manner as that in Example 5 except that polyethylene glycol was used in place of polyethylene oxalate, and that chloroform was used as the solvent.

Note that polyethylene glycol used herein was PEG 3000 manufactured by Wako Pure Chemical Industries, Ltd.

Comparative Example 6

A film was formed in the same manner as that in Example 5 except that stearic acid (manufactured by Wako Pure Chemical Industries, Ltd.) was used in place of polyethylene oxalate, and that chloroform was used as the solvent.

Comparative Example 7

A film made of polylactic acid alone was formed in the same manner as that in Example 5 except that no polyethylene oxalate was added.

The substances added to polylactic acid in Example 5, Reference Example 1 and Comparative Examples 4 to 6 described above have the following properties.

TABLE 3

| | Property | pH* |
|---|---|---|
| Polyethylene oxalate (Oxalic acid) | acidic | 1.63 |
| Maleic anhydride (Maleic acid) | acidic | 1.79 |
| Polyethylene succinate (Succinic acid) | acidic | 2.86 |
| Polyethylene glycol | neutral | 6.46 |
| Stearic acid | insoluble | —** |

*Measured value obtained at a concentration of 0.005 g/m by dissolving each acid monomer in the parentheses into water. The value of polyethylene glycol is obtained after dissolution of the polymer.
**pH of stearic acid cannot be measured due to its insolubility.

As similar to the enzymatic degradation test described above, an enzymatic degradation solution was prepared by adding 12 μl of the enzyme solution into 10 ml of the 0.01 M Tris-HCl buffer (pH 8.0). Into the enzymatic degradation solution, the films of Example 5, Reference Example 1 and Comparative Examples 4 to 7 each cut into 2 cm×2 cm were immersed, and shaken at 37° C. and at 50 rpm. After 1 week, the internal structure of each film was observed with an electron microscope. FIG. 4 shows the electron microphotographs. When the internal structures of each film before and after the reaction were compared, it can be seen that degradation proceeded from the inside of the film in Example 5 where oxalic acid was released by hydrolysis and in Reference Example 1 where maleic acid was released by hydrolysis.

Change in weight average molecular weight of polylactic acid in films of Example 5, Reference Example 1, Comparative Example 4, Comparative Example 5, and Comparative Example 7 before and after enzymatic degradation reaction was measured by a GPC. The GPC used was HLC-8120 manufactured by TOSOH CORPORATION, a column used was TSK gel Super HM-H, and a guard column used was TSK guard column Super H-H. A column oven was kept at 40° C. Chloroform was used as an eluent, and the flow rate thereof was set to 0.5 ml/min. The amount of sample injected was 15 μl. Polystyrene dissolved in chloroform was used as a standard. As for sample preparation, chloroform was used as a solvent with a sample concentration of 5 mg/ml, and the sample was filtered for use. FIG. 5 shows results. The weight average molecular weight of polylactic acid in the film significantly decreased in Example 5 where polyethylene oxalate (PEOx) was dispersed in polylactic acid and in Reference Example 1 where maleic anhydride (MA) was dispersed in polylactic acid. It can be seen from these results that degradation of polylactic acid proceeded in films that release an acid with a pH of 2.0 or less.

(Comparison of Degradation Rates with Different Polarities)

In order to compare different polylactic acid degradation rates due to the polarities of dispersed polyesters, films were formed in which polyethylene oxalate (PEOx) and poly(neopentyl) oxalate (PNOx) were respectively dispersed in polylactic acid (PLA), and subjected to enzymatic degradation test. The details are as follows.

Example 6

Formation of a Hot Pressed Film Including PEOx by 5% to PLA 9.5 g of PLA was dry-blended with 0.5 g of PEOx, and then kneaded (200° C., 50 rpm) by a micro kneader manufactured by Toyo Seiki Seisaku-sho, LTD. The obtained pellet containing 5% PEOx or PNOx was dissolved at 200° C. for 5 minutes, and then heat-pressed at a pressure of 40 to 50 kgf/cm$^2$ to form a film.

Example 7

A film was formed in the same manner as that in Example 6 except that polyneopentyl oxalate (PNOx) was used in place of polyethylene oxalate.

Note that polyneopentyl oxalate was synthesized as follows.

Synthesis Of Polyneopentyl Oxalate (PNOx)

118 g (1.0 mol) of dimethyl oxalate, 125 g (1.2 mol) of neopentyl glycol, and 0.2 g of tetrabutyl titanate were introduced into a 300-mL separable flask equipped with a mantle heater, a stirrer, a nitrogen inlet and a condenser. The flask was heated under nitrogen stream at 100° C. until the inside temperature reached 160° C., while methanol was being distilled off. Eventually, 55 ml of methanol was distilled off. Thereafter, stirring was performed at an inside temperature of 200° C. and at a reduced pressure of 0.1 to 0.5 mmHg. After 4 and a half hours, the viscosity increased, and the product was taken off.

Comparative Example 8

A film made of polylactic acid alone was formed in the same manner as that in Example 6 except that no polyethylene oxalate was added.

Polylactic acid, polyethylene oxalate, and polyneopentyl oxalate used in above-described Example 6, Example 7, and Comparative Example 8 have the following properties.

TABLE 4

|  | Tg (° C.) | SP value | pKa of monomer |
|---|---|---|---|
| Polylactic acid | 58 | 21.5 | 3.86 (lactic acid) |
| Polyethylene oxalate | 30 | 25.98 | 1.2, 4.2 (oxalic acid) |
| Polyneopentyl oxalate | — | 22.1 | 1.2, 4.2 (oxalic acid) |

Tg: Glass transition temperature
SP value: Solubility parameter (based on the Fedors method)

In addition, FIG. 6 shows dissolution test results obtained by dissolving each polymer of polyethylene oxalate and polyneopentyl oxalate alone in water. It can be seen that PEOx high in SP value, i.e., highly polarized PEOx, starts to hydrolyze at an earlier stage.

An enzymatic degradation solution was prepared by adding 12 μl of the enzyme solution into 10 ml of a 20 mM phosphate buffer (pH 7.0). Into the enzymatic degradation solution, the films of Example 6, Example 7 and Comparative Example 8 each cut into 2 cm×2 cm were immersed, and shaken at 37° C. and at 100 rpm. FIG. 7 shows weight decrease after two-day and one-week reaction. These results show that the degradation rate of polylactic acid in Example 8 where polyethylene oxalate with high polarity was dispersed is higher than that in Example 9 where polyneopentyl oxalate with low polarity was dispersed, although these polymers contain oxalic acid in common.

BRIEF DESCRIPTION OF THE DRAWINGS

FIG. 1 shows electron microphotographs of films of Example 3 and Comparative Example 1 enzymatically degraded for 48 hours.

Figure 2:
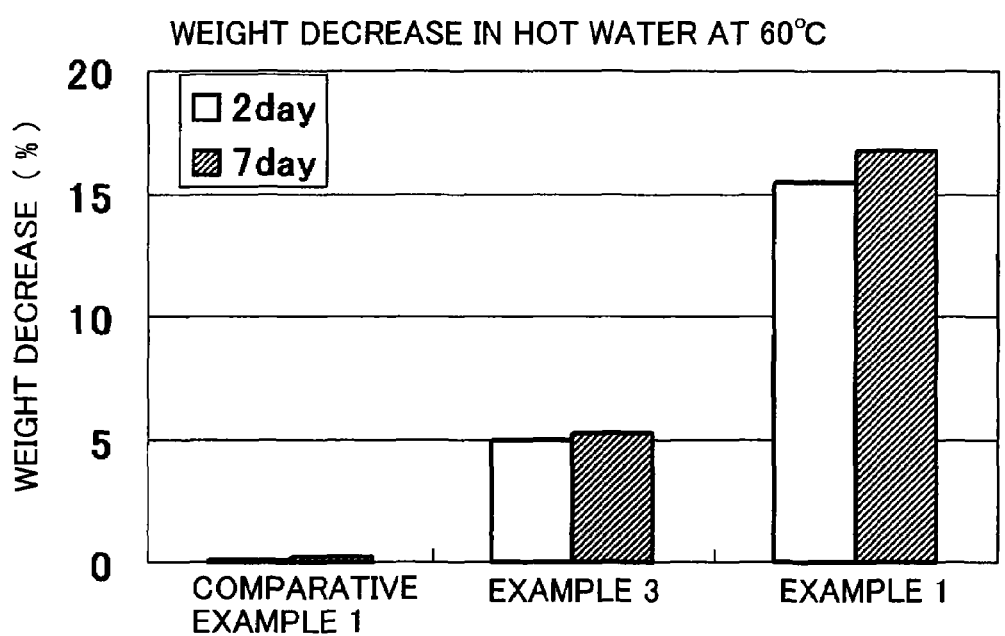
FIG. 2 is a graph showing weight decrease of films (Examples 1 and 3, and Comparative Example 1) immersed in hot water at 60° C.
Figure 3:
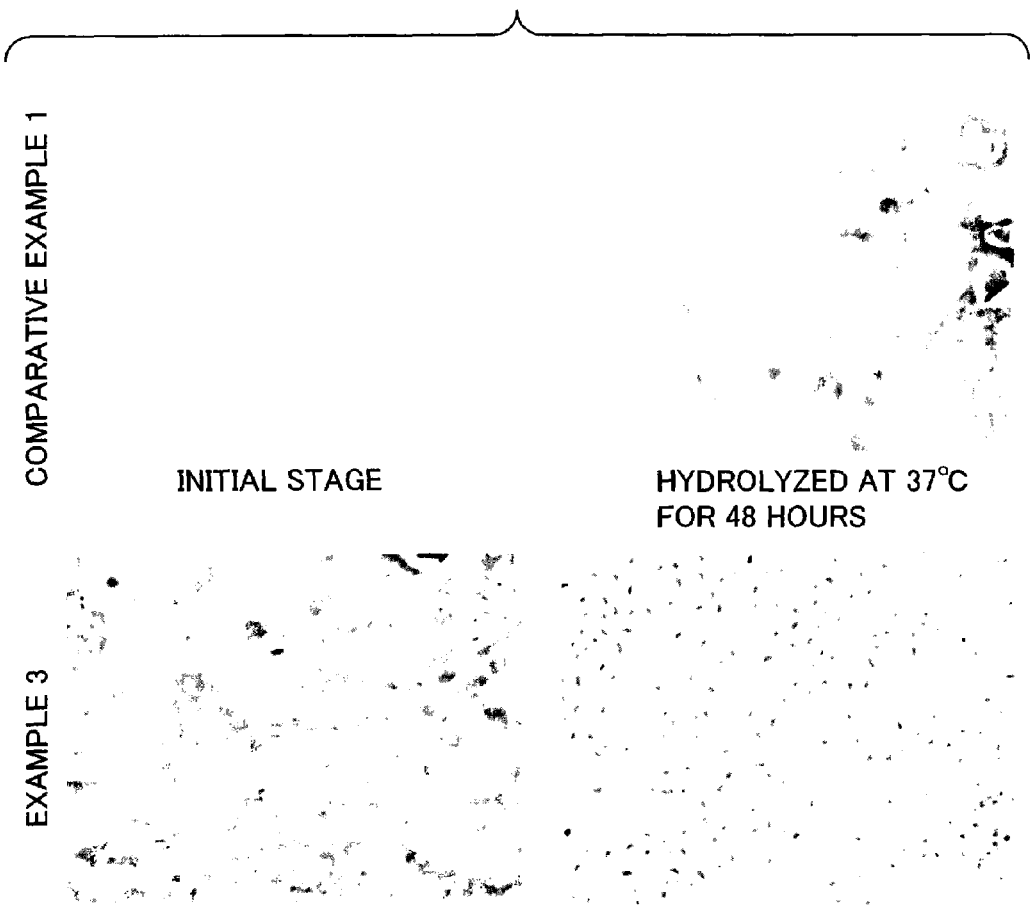
FIG. 3 shows electron microphotographs of films of Example 3 and Comparative Example 1 immersed in water at 37° C. for 48 hours.
Figure 4:
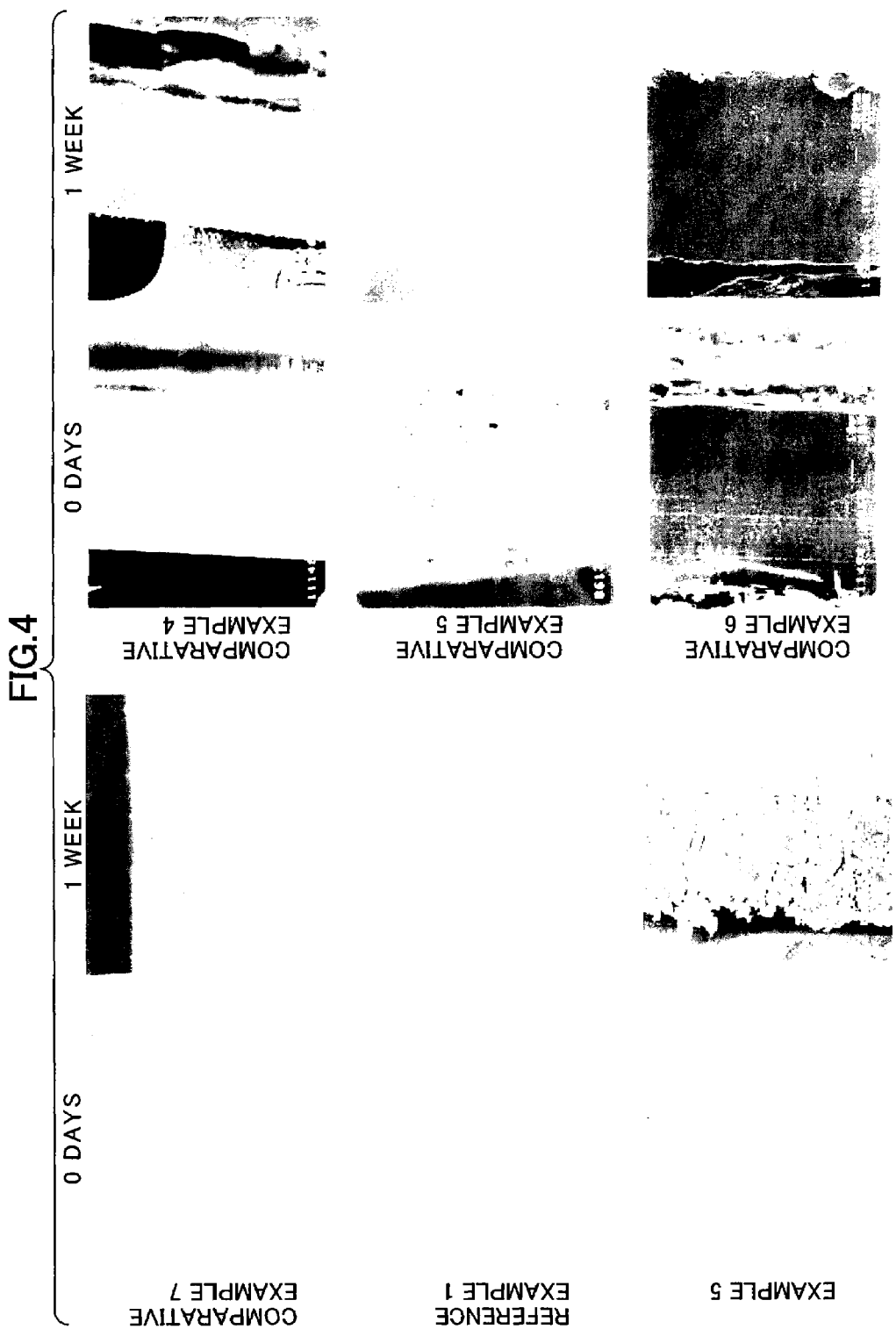
FIG. 4 shows electron microphotographs of films of Example 5, Reference Example 1, and Comparative Examples 4 to 7 enzymatically degraded for 1 week.
Figure 5:
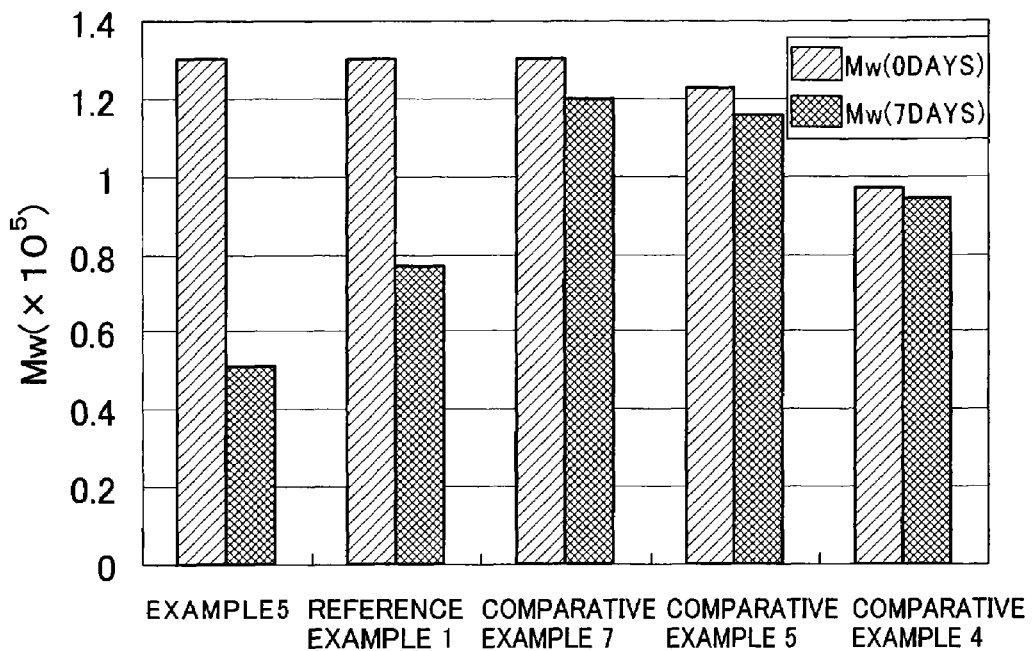
FIG. 5 is a graph showing decrease of the weight average molecular weight of polylactic acid in films of Example 5, Reference Example 1, Comparative Example 4, Comparative Example 5, and Comparative Example 7 enzymatically degraded for 1 week.
Figure 6:
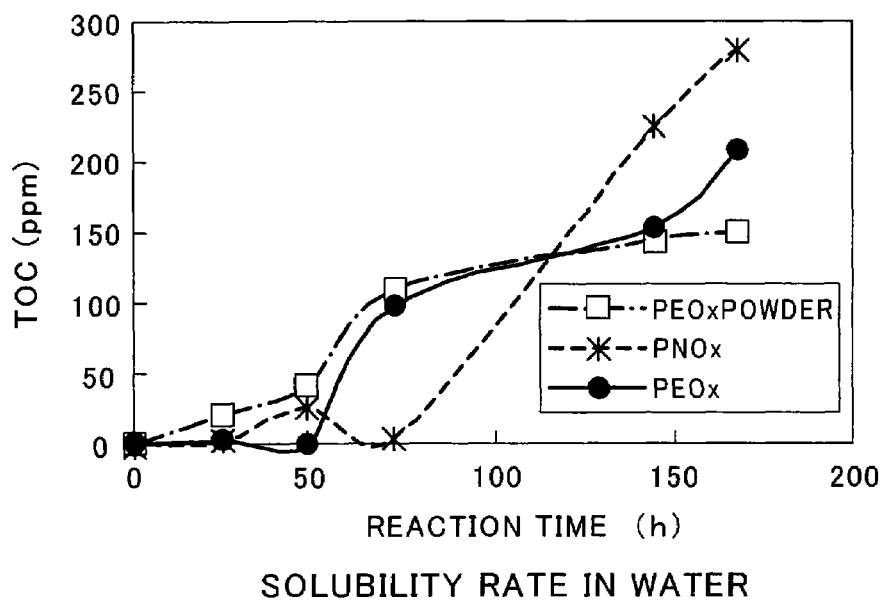
FIG. 6 is a graph showing dissolution of each polymer of polyethylene oxalate and polyneopentyl oxalate alone into water.
Figure 7:
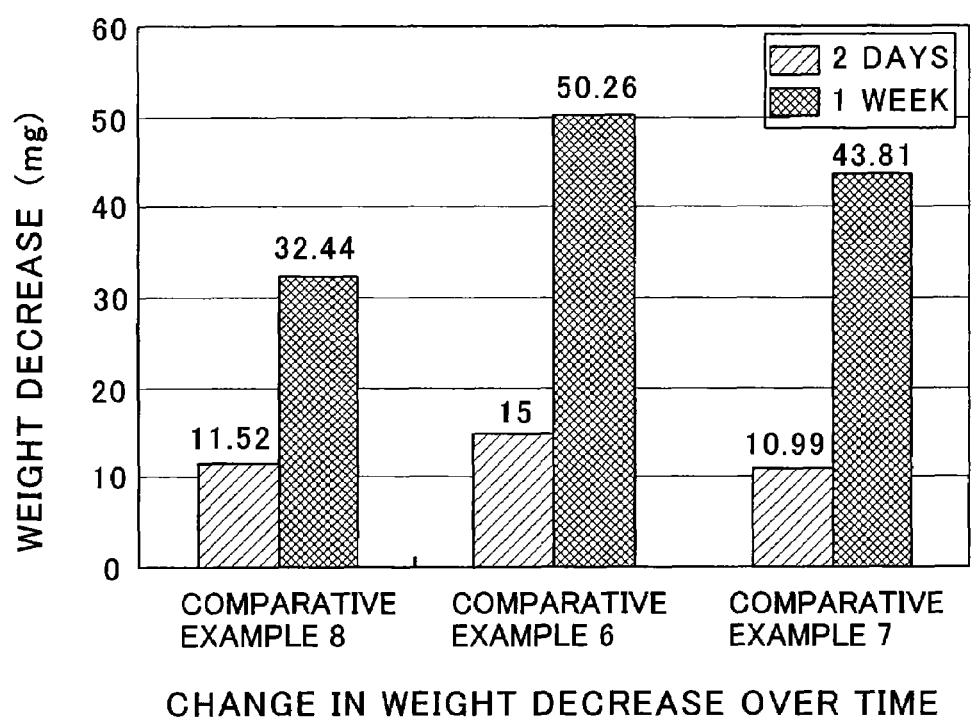
FIG. 7 is a graph showing weight decrease of films of Comparative Example 8, Example 6, and Example 7 enzymatically degraded for 2 days and for 1 weeks.

The invention claimed is:

1. A readily degradable resin composition comprising:
an aliphatic polyester (A) which is biodegradable; and
an aliphatic polyester (B) dispersed in said aliphatic polyester (A), which is biodegradable at a higher degradation rate than that of the aliphatic polyester (A) and which has a melt viscosity of 50 Pa·S or less at 190° C. and at a shear rate of 1 rad/s or a solution viscosity (η inh) of 0.25 dl/g or less measured under conditions of a concentration of 0.4 g/dl and of a temperature of 30° C. in a solvent of m-chlorophenol and 1,2,4-trichlorobenzene mixed at a weight ratio of 4:1, wherein the aliphatic polyester (B) has a solubility parameter calculated by the Fedors method of 25 or more and a content of the aliphatic polyester (B) within the composition is 1 to 30% by weight, and wherein the aliphatic polyester (B) is hydrolyzed inside the readily degradable resin composition and the eluted acid component hydrolyzes the aliphatic polyester (A) to accelerate degradation.

2. The readily degradable resin composition according to claim 1, wherein a content of the aliphatic polyester (B) or (B') is 1 to 5% by weight.

3. The readily degradable resin composition according to claim 1, wherein the aliphatic polyester (B) or (B') includes at least one kind of monomer of the aliphatic polyester (A) as a copolymerization component.

4. The readily degradable resin composition according to claim 1, wherein the aliphatic polyester (B) or (B') includes polyethylene oxalate.

5. The readily degradable resin composition according to claim 1, wherein the aliphatic polyester (A) includes a polylactic acid resin or polybutylene succinate.

6. A biodegradable container comprising the readily degradable resin composition according to claim 1.

7. A readily degradable resin composition comprising:
an aliphatic polyester (A) which is biodegradable; and
an aliphatic polyester (B') dispersed in said aliphatic polyester (A), which is biodegradable at a higher degradation rate than that of the aliphatic polyester (A) and which releases, upon hydrolysis, an acid showing a pH of 2.0 or less when dissolved in water at a concentration of 0.005 g/ml, wherein the aliphatic polyester (B') has a solubility parameter calculated by the Fedors method of 25 or more and a content of the aliphatic polyester (B') within the composition is 1 to 30% by weight, and wherein the aliphatic polyester (B') is hydrolyzed inside the readily degradable resin composition and the eluted acid component hydrolyzes the aliphatic polyester (A) to accelerate degradation.

8. The readily degradable resin composition according to claim 7, wherein the acid to be released is oxalic acid or maleic acid.

9. The readily degradable resin composition according to claim 7, wherein a content of the aliphatic polyester (B) or (B') is 1 to 5% by weight.

10. The readily degradable resin composition according to claim 7, wherein the aliphatic polyester (B) or (B') includes at least one kind of monomer of the aliphatic polyester (A) as a copolymerization component.

11. The readily degradable resin composition according to claim 7, wherein the aliphatic polyester (B) or (B') includes polyethylene oxalate.

12. The readily degradable resin composition according to claim 7, wherein the aliphatic polyester (A) includes a polylactic acid resin or polybutylene succinate.

13. A biodegradable container comprising the readily degradable resin composition according to claim 7.

* * * * *